US012117522B2

(12) United States Patent
Langer et al.

(10) Patent No.: US 12,117,522 B2
(45) Date of Patent: Oct. 15, 2024

(54) METHOD AND APPARATUS FOR DETECTING A MOVING OBJECT AND OBJECT COUNTING SYSTEM

(71) Applicant: Infineon Technologies AG, Neubiberg (DE)

(72) Inventors: Tim Hauke Langer, Dresden (DE); Florian Kelber, Dresden (DE); Christian Georg Mayr, Radebeul (DE); Johannes Partzsch, Dresden (DE); Bernd Waschneck, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 107 days.

(21) Appl. No.: 17/936,197

(22) Filed: Sep. 28, 2022

(65) Prior Publication Data

US 2023/0111734 A1 Apr. 13, 2023

(30) Foreign Application Priority Data

Oct. 12, 2021 (EP) ................................. 21202292

(51) Int. Cl.
*G08B 25/06* (2006.01)
*G01S 7/527* (2006.01)
*G01S 15/52* (2006.01)

(52) U.S. Cl.
CPC .......... *G01S 15/526* (2013.01); *G01S 7/5273* (2013.01)

(58) Field of Classification Search
USPC .............. 340/538.15, 539.1, 539.12, 539.22, 340/539.32, 545.8, 568.1, 686.6, 686.1, 340/3.1
See application file for complete search history.

(56) References Cited

U.S. PATENT DOCUMENTS

| 5,187,688 | A | 2/1993 | Saruta |
| 5,800,358 | A | 9/1998 | Webb et al. |
| 10,634,544 | B1* | 4/2020 | Przybyla ............. G01F 23/2962 |
| 2008/0036580 | A1 | 2/2008 | Breed |
| 2012/0053826 | A1* | 3/2012 | Slamka .................. G01C 21/20 701/301 |
| 2012/0174664 | A1* | 7/2012 | Welle .................... G01F 23/284 73/290 V |

(Continued)

FOREIGN PATENT DOCUMENTS

EP 3798685 A1 3/2021

OTHER PUBLICATIONS

Shih, Oliver et al., "Occupancy Estimation using Ultrasonic Chirps", ICCPS 15, Apr. 14-16, 2015, Seattle, WA, USA, 10 pages.

(Continued)

*Primary Examiner* — Daniel Previl
(74) *Attorney, Agent, or Firm* — Slater Matsil, LLP

(57) ABSTRACT

A method for detecting a moving object in a scene includes providing sampled ultrasonic echo signals from the scene; determining echo envelopes of the sampled ultrasonic echo signals; determining differentials of successive echo envelopes for providing echo envelope differentials; determining the absolute values of the echo envelope differentials; and conducting a classification based on the determined absolute values of the echo envelope differentials for determining a relative movement of the moving object.

20 Claims, 12 Drawing Sheets

(56) References Cited

U.S. PATENT DOCUMENTS

| | | | | |
|---|---|---|---|---|
| 2014/0369168 A1* | 12/2014 | Max | ................ | G01S 7/539 |
| | | | | 367/93 |
| 2016/0274202 A1* | 9/2016 | Stemmer | .......... | G01R 33/56563 |
| 2022/0057498 A1* | 2/2022 | Duval | ................ | G01S 15/42 |

OTHER PUBLICATIONS

Choi, Jeong Woo et al., "Bi-Directional Passing People Counting System Based on IR-UWB Radar Sensors" IEEE Internet of Things Journal, vol. 5, No. 2, Apr. 2018, pp. 512-522.

Ghosh, Arindam et al., "UltraSense: A non-intrusive approach for human activity identification using heterogeneous ultrasonic sensor grid for smart home environment" Journal of Ambient Intelligence and Humanized Computing, https://doi.org/10.1007/s12652-019-01260-y, Mar. 19, 2019, 22 pages.

Hnat, Timothy W. et al., "Doorjamb: Unobtrusive Room-level Tracking of People in Homes using Doorway Sensors" SenSys' 12, Nov. 6-9, 2012, Toronto, ON, Canada, 14 pages.

Raj, Bhiksha et al., "Ultrasonic Doppler Sensing in HCI" Pervasive Computing, Apr.-Jun. 2012, pp. 24-29.

\* cited by examiner

METHOD AND APPARATUS FOR DETECTING A MOVING OBJECT AND OBJECT COUNTING SYSTEM

This application claims the benefit of European Patent Application No. 21202292, filed on Oct. 12, 2021, which application is hereby incorporated herein by reference.

TECHNICAL FIELD

Examples of the present disclosure are related to a method and an apparatus for detecting a moving object in a scene.

BACKGROUND

Further examples are related to an object counting system. Further examples are related to a method for counting objects. Examples of the disclosure are related to ultrasonic detection of a walking direction. Some examples are related to a setup for the classification of walking direction based on ultrasonic signals.

In the field of smart cities, one aim is to make cities more energy efficient and to add smart computing systems for enhanced services such as improved emergency management or traffic control. A subfield of smart cities is the smart automation of buildings. It is estimated that the energy consumption of buildings, especially office buildings, can be reduced, especially in the heating, ventilation and air conditioning (HVAC) domain where commonly devices are operated independently of the number of persons in a room. Adapting HVAC systems to the number of persons in a room may provide for a more efficient operation of these systems. To this end, it is necessary to know the approximate number of persons in a room. Another advantage of knowing the exact number of persons in a room is in the case of an emergency event: when a large building needs to be evacuated, it is essential to know how many people are left in the building and where they are. A complex system of entrance counting sensors at each passing point can give information about the number of people in certain rooms or building tracts, giving the emergency forces a technical aid for an evacuation plan. Furthermore, such a system can help to identify moving people streams, potentially also helping to identify emergency events and send an alert. A further scenario, in which a number of people may be relevant, is in shopping centers, where the number of shoppers in a shop or in a certain area of a shop can be detected. The results can then be evaluated for commercial use to analyze the shopper's behavior. With the Covid pandemic, even another scenario arises due to the restricted amount of people in rooms, shops, supermarkets or buildings. People counting can be used to detect whether a given threshold of people present is exceeded or not to decide whether additional persons may enter the room or building.

Two different approaches for counting the number of people in a room, a building, or part of a building, are counting persons within an area from the crowd, or alternatively, by entry or exit events into or from the specific area. Solutions for counting people from a crowd may be based on vision-based cameras, or alternatively, the reverberation of a room in response to an ultrasonic chirp may be detected. Existing entrance counting solutions are based on camera vision, time-of-flight camera, PIR (pyroelectric infrared) sensor solutions, radar sensors or ultrasonic sensors.

Beyond the ultrasonic sensors, solutions exist which are able to detect the presence of a person. Further, using ultrasonic continuous wave signals also enables the detection of the walking direction by evaluating the Doppler shift. Further, solutions using multiple ultrasonic sensors have been proposed, detecting the walking direction by the triggering sequence of the individual ultrasonic sensors.

In general, it would be desirable to have a concept detecting a moving object, allowing for an improved tradeoff between a simple, cost-efficient implementation, a high detection accuracy and a low power consumption.

SUMMARY

Examples of the present disclosure rely on the idea to use ultrasonic echo signals for detecting a moving object. In particular, the ultrasonic echo signals are evaluated by determining envelopes of the ultrasonic echo signals and by determining differentials of successive echo envelopes. It was realized, that moving objects may be detected on the basis of these echo envelope differentials particularly energy efficient. For example, relatively low pulse rates may be applied, in particular in comparison with methods relying on the measurement of a Doppler shift. It was realized, that such a processing of ultrasonic echo signals allows for an accurate classification of the ultrasonic echo signals, and thus, for an accurate determination of a relative movement of a moving object.

Examples of the present disclosure provide a method for detecting a moving object in a scene. The method comprises a step of providing sampled ultrasonic echo signals from the scene. The method further comprises a step of determining echo envelopes of the sampled ultrasonic echo signals. A further step of the method comprises determining differentials of successive echo envelopes for providing echo envelope differentials. The method further comprises determining the absolute values of the echo envelope differentials. The method further comprises conducting a classification based on the determined absolute values of the echo envelope differentials for determining a relative movement of the moving object.

Further examples of the present disclosure provide an apparatus for detecting a moving object in a scene. The apparatus comprises an ultrasonic receiver for receiving ultrasonic echo signals from the scene and for sampling the received ultrasonic echo signals. The apparatus further comprises a processing means. The processing means is configured to determine echo envelopes of the sampled ultrasonic echo signals. The processing means is further configured to determine differentials of two successive echo envelopes for providing echo envelope differentials. The processing means is further configured to determine the absolute values of the echo envelope differentials. Further, the processing means is configured to conduct a classification based on the determined absolute values of the echo envelope differentials for determining a relative movement of the moving object.

Further examples of the present disclosure provide an object counting system. The object counting system comprises an ultrasonic transmitter for transmitting an ultrasonic signal into a scene. The object counting system further comprises the apparatus for detecting a moving object in a scene.

BRIEF DESCRIPTION OF THE DRAWINGS

Examples and advantageous implementations of the present disclosure are described in more detail below with respect to the figures, among which.

DETAILED DESCRIPTION OF ILLUSTRATIVE EMBODIMENTS

In the following, examples are discussed in detail, however, it should be appreciated that the examples provide many applicable concepts that can be embodied in a wide variety of ultrasound applications. The specific examples discussed are merely illustrative of specific ways to implement and use the present concept, and do not limit the scope of the examples. In the following description, a plurality of details is set forth to provide a more thorough explanation of examples of the disclosure. However, it will be apparent to one skilled in the art that other examples may be practiced without these specific details. In other instances, well-known structures and devices are shown in form of a block diagram rather than in detail in order to avoid obscuring examples described herein. In addition, features of the different examples described herein may be combined with each other, unless specifically noted otherwise.

In the following description of examples, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different examples.

Figure 1:
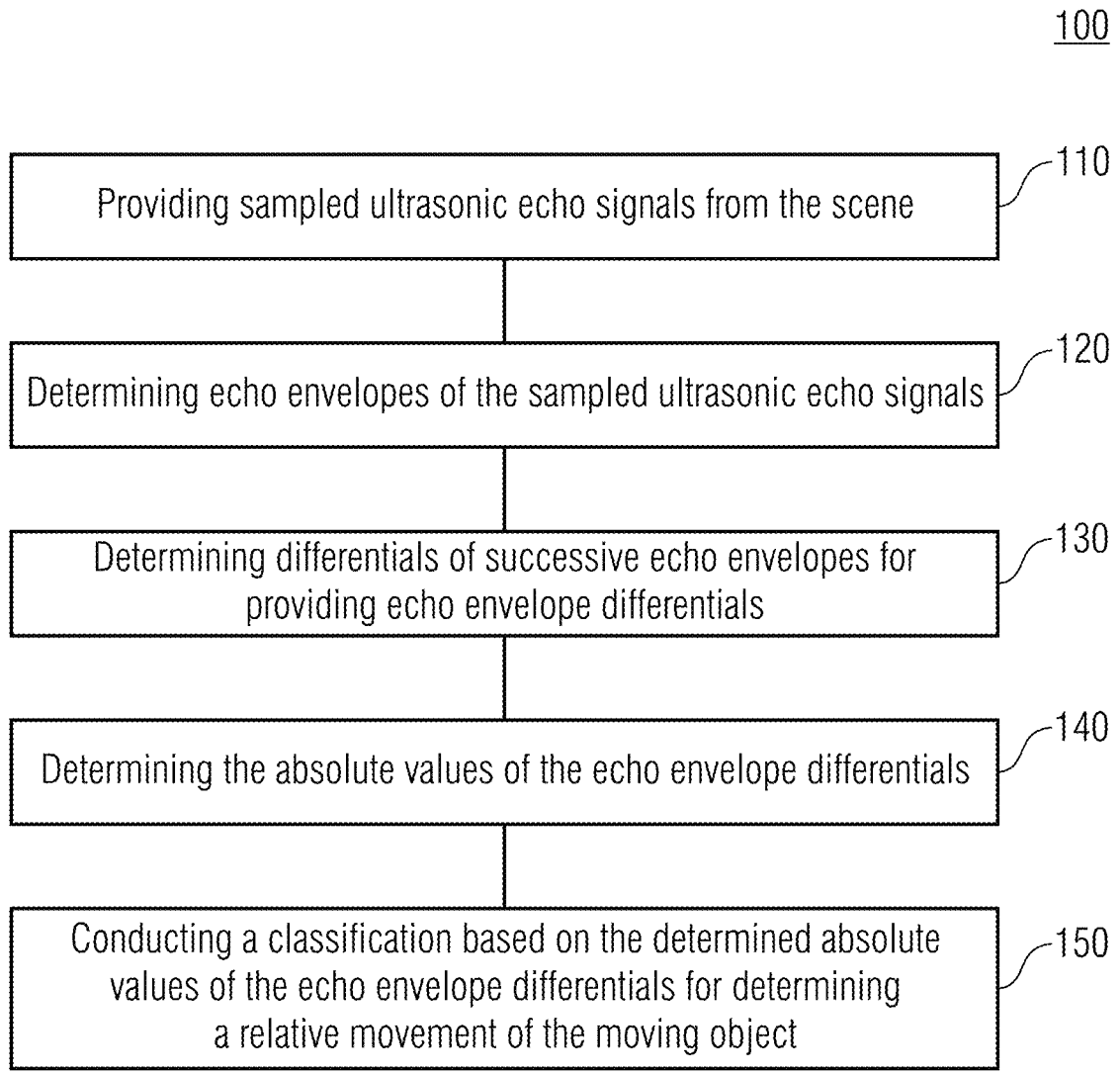
FIG. 1 illustrates a flowchart of a method for detecting a moving object according to an example.

FIG. 1 illustrates a block diagram of a method 100 for detecting a moving object in a scene according to an example of the present disclosure. The method 100 comprises a step 110 of providing sampled ultrasonic echo signals from the scene. The method 100 further comprises a step 120 of determining echo envelopes of the sampled ultrasonic echo signals. Further, method 100 comprises a step 130 of determining differentials of successive echo envelopes for providing echo envelope differentials. Method 100 comprises a step 140 of determining the absolute values of the echo envelope differentials. A step 150 of method 100 comprises conducting a classification based on the determined absolute values of the echo envelope differentials for determining a relative movement of the moving object.

Figure 2:
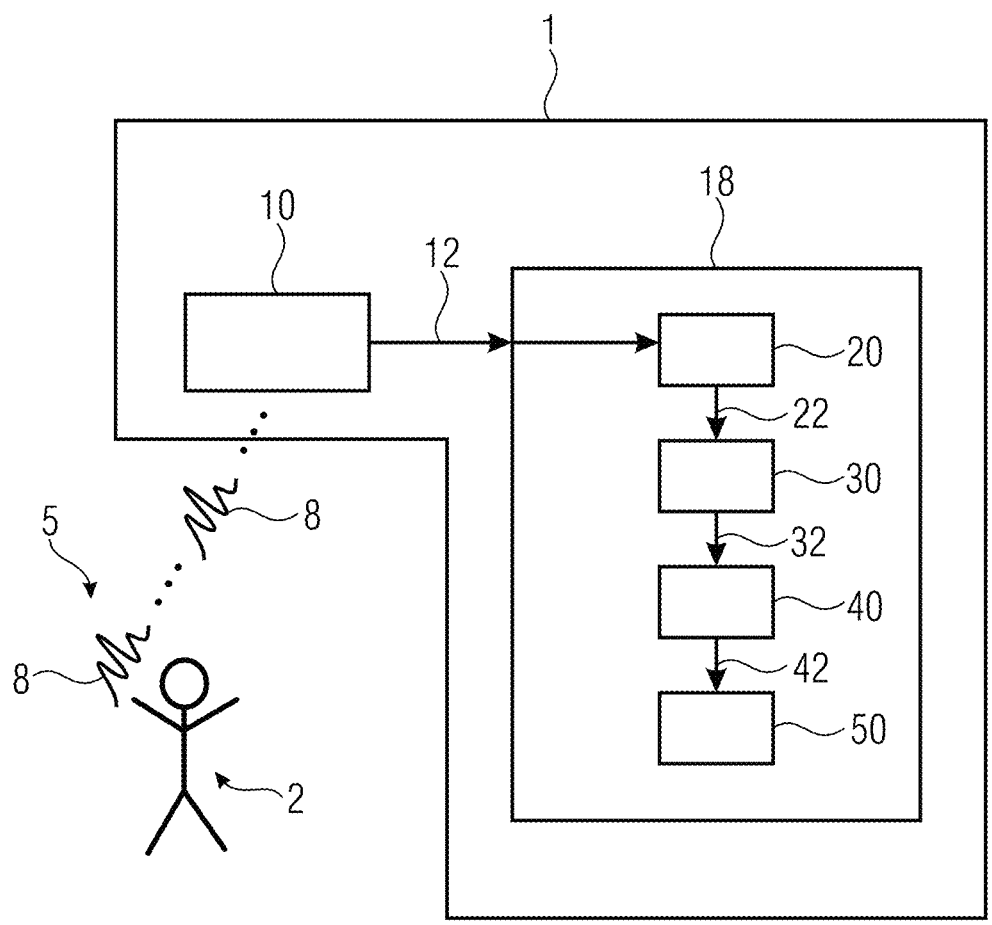
FIG. 2 illustrates an apparatus for detecting a moving object according to an example.

FIG. 2 illustrates an apparatus 1 for detecting a moving object 2, e.g. a person or an animal, in a scene 5 according to an example of the present disclosure. The apparatus 1 comprises an ultrasonic receiver 10 for receiving ultrasonic echo signals 8 from the scene 5. The ultrasonic receiver 10 is for sampling the received ultrasonic echo signals, so as to provide sampled ultrasonic echo signals 12. The apparatus 1 further comprises a processing means 18. The processing means 18 comprises a module 20 configured to determine echo envelopes 22 of the sampled ultrasonic echo signals 12. The processing means 18 further comprising module 30, which is configured to determine differentials of successive echo envelopes 22 for providing echo envelope differentials 32. The processing means 18 comprises a module 40, which is configured to determine the absolute values 42 of the echo envelope differentials 32. The processing means 18 further comprises a module 50 configured to conduct a classification based on the determined absolute values 42 of the echo envelope differentials for determining a relative movement of the moving object 2.

Thus, the apparatus 1 may be configured for performing the method 100 of FIG. 1. To this end, the ultrasonic receiver 10 may perform step 110, and modules 20, 30, 40, 50 may perform the steps 120, 130, 140, 150, respectively. In the following, a description of elements of the apparatus 1 may equivalently apply to the respective steps of the method 100 and vice versa. Also, optional additional steps described with respect to the method 100 may be performed by respective modules of the processing means 18. In the following, the steps following step 110, i.e. steps performed by the processing means 18 may be summarized as signal processing. Also steps between step 110 and step 150 may be referred to as pre-processing steps.

The scene 5 may, for example, be an area or a space towards which the ultrasonic receiver 10 is directed so as to receive the ultrasonic echo signals 8. The ultrasonic echo signals 8 may be reflected ultrasonic signals, reflected by objects within the space or by boundaries limiting the space such as walls or the floor. For example, within the scenario of counting people passing a door, the scene may refer to space in or adjacent to the door.

The ultrasonic echo signals 8 may be echoes of ultrasonic pulses which may, for example, be transmitted by an ultrasonic transmitter which may optionally be part of apparatus 1. That is, the apparatus 1 may comprise a transmitter for transmitting ultrasonic signals.

Figure 3:
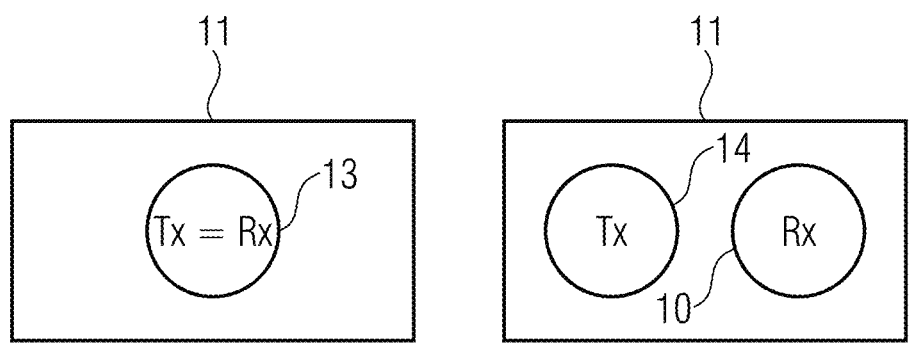
FIG. 3 illustrates examples of ultrasonic devices.
Figure 4A:
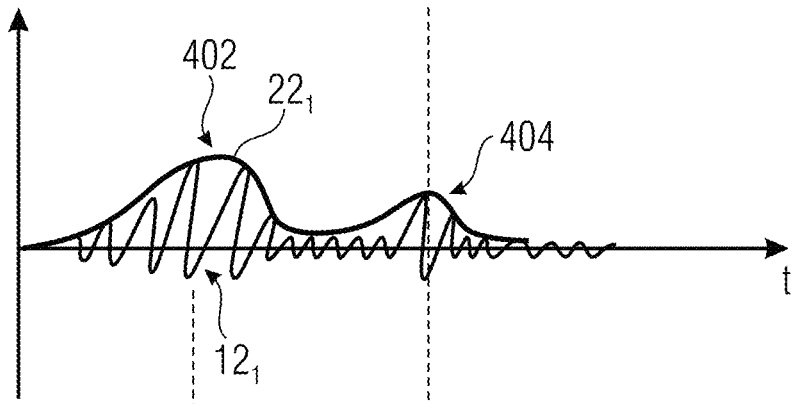
FIGS. 4a-4d illustrate examples of signals at different stages of signal processing according to an example.
Figure 4B:
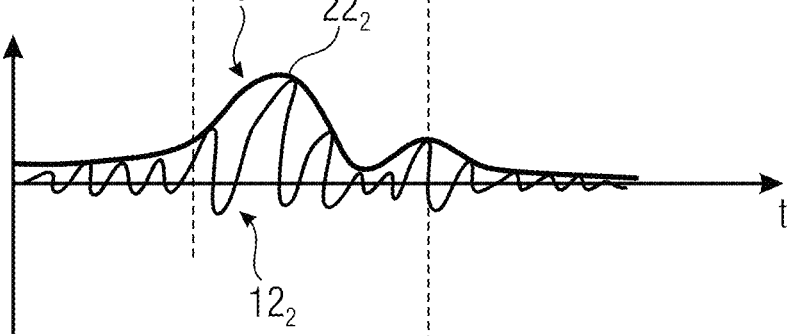
Figure 4C:
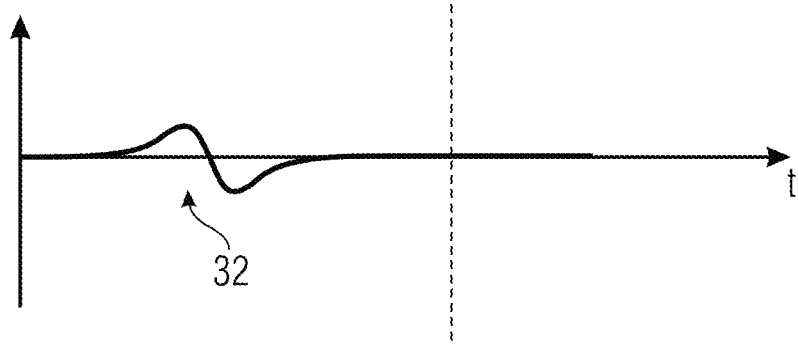
Figure 4D:
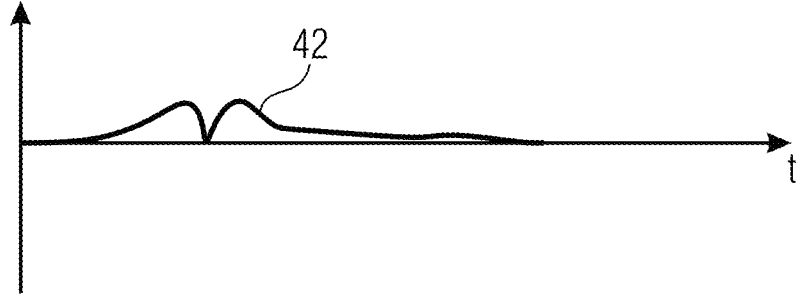

FIG. 3 illustrates examples of an ultrasonic device 11, which may optionally be part of apparatus 1. According to one example, illustrated in the left panel of FIG. 3, the ultrasonic device 11 comprises an ultrasonic transceiver 13 for fulfilling the function of the ultrasonic receiver 10 of apparatus 1, and for transmitting ultrasonic pulses. According to another example, illustrated in the right panel of FIG. 3, the ultrasonic device 11 comprises the ultrasonic receiver 10 and comprises an ultrasonic transmitter 14, which is separate from the ultrasonic receiver 10. The former example may have the advantage of lower implementation effort and a more space-efficient implementation. The latter example has the advantage that ringing in the received ultrasonic signals may be avoided.

For example, the transducer, receiver, and/or transceiver may be implemented as integrated transducer, e.g. CMUT or PMUT, or a bulk transducer, or a MEMS microphone.

Continuing with the description of FIG. 2, the sampled ultrasonic echo signals 12 provided by the receiver 10 may comprise a plurality of samples. The number of samples of each of the sampled ultrasonic echo signals 12 may depend on a temporal sampling rate and a depth of a detection window (e.g., as will be described with respect to FIG. 12) within which moving objects in the scene 5 are to be detected. Thus, each of the sampled ultrasonic echo signals 12 may represent a temporally sampled received sound intensity, sampled over a timeframe associated with a respective ultrasonic pulse. The timeframe may be defined by the detection window. The ultrasonic receiver 10 may provide a sequence of sampled ultrasonic echo signals 12, each of which is associated to a respective ultrasonic pulse of a sequence of ultrasonic pulses. Thus, the ultrasonic receiver 10 may provide a sequence of sampled ultrasonic echo signals 12.

An echo signal 8 reflected by the object 2 may result in a signature in the envelope of a sampled ultrasonic echo signals 12, wherein a position of the signature in terms of temporal samples may represent a distance between the ultrasonic receiver 10 and the object 2. By determining envelope differentials 32 of successive echo envelopes 22, being associated with echo signals 8 of successive ultrasonic pulses, signatures within the echo signals 8, which originate from non-moving objects, such as the surroundings of the scene 5 like walls or floors, or still objects within the scene 5, may be excluded from the further processing.

For example, step 130 may be performed by determining the difference between two successive echo envelopes 22. Step 130 may include determining the differentials or differences between each two successive echo envelopes 22 of a set of echo envelopes 22. The set of echo envelopes may include all or a portion of the sequence of echo envelopes determined during a time interval under consideration. For example, for each of the echo envelopes, the echo envelope differential is determined by determining the difference between the echo envelope and the preceding, e.g. directly preceding, (or, in alternative implementations, the subsequent, e.g. directly subsequent) echo envelope. Determining the difference between two echo envelopes may refer to determining the differences between the sample values of pairs of corresponding samples of the two echo envelopes.

FIG. 4 illustrates examples of the sampled ultrasonic echo signals 12, the echo envelopes 22, the echo envelope differentials 32, and the absolute values 42. FIG. 4a shows a diagram illustrating a first sampled ultrasonic echo signal 121. The samples of the sampled ultrasonic echo signal are arranged along the abscissa of the diagram, while the ordinate represents, for example, received signal strength of the received ultrasonic signal. FIG. 4a further shows a first echo envelope 221 of the first sampled ultrasonic echo signal 121. In the illustrative example of FIG. 4, the echo envelope 221 comprises two extrema, namely a first extremum 402 and a second extremum 404, which may be attributed to two objects at different distances within the scene 5. The diagram of FIG. 4b illustrates a second sampled ultrasonic echo signal 122 and a corresponding second echo envelope 222. The second sampled ultrasonic echo signal 122 is a successive echo signal of the first sampled ultrasonic echo signal 121. As illustrated, the first extremum 402 has different positions within the first and second echo envelopes 221, 222, indicating a movement of the corresponding object. The position of the extremum 404 is identical within the echo envelopes 221, 222, indicating that the extremum 404 represents a still object. The diagram of FIG. 4c illustrates an example of an echo envelope differential 32, which is the difference between the first echo envelope 221 and the second echo envelope 222. As illustrated by FIG. 4c, determining the differentials between successive echo envelopes 22 suppresses or rejects signatures originating from still objects while maintaining the signature of moving objects. FIG. 4d shows a diagram of an example of the absolute values 42 of the echo envelope differential 32 of FIG. 4c.

Figure 5:
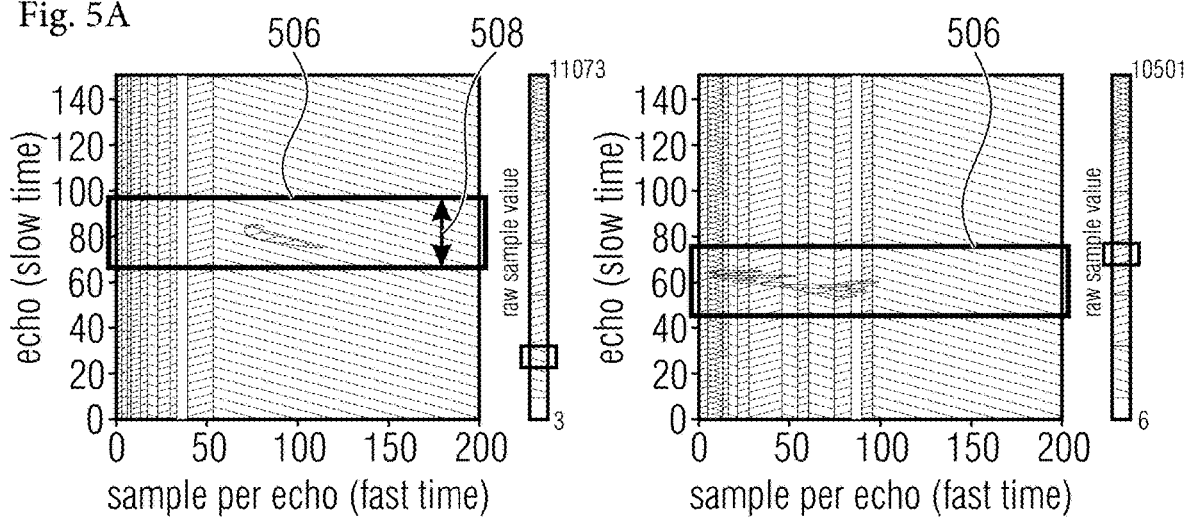
FIGS. 5a-5c illustrate examples of a sequence of echo signals at different stages of the signal processing for an object moving in a first direction.
Figure 5:
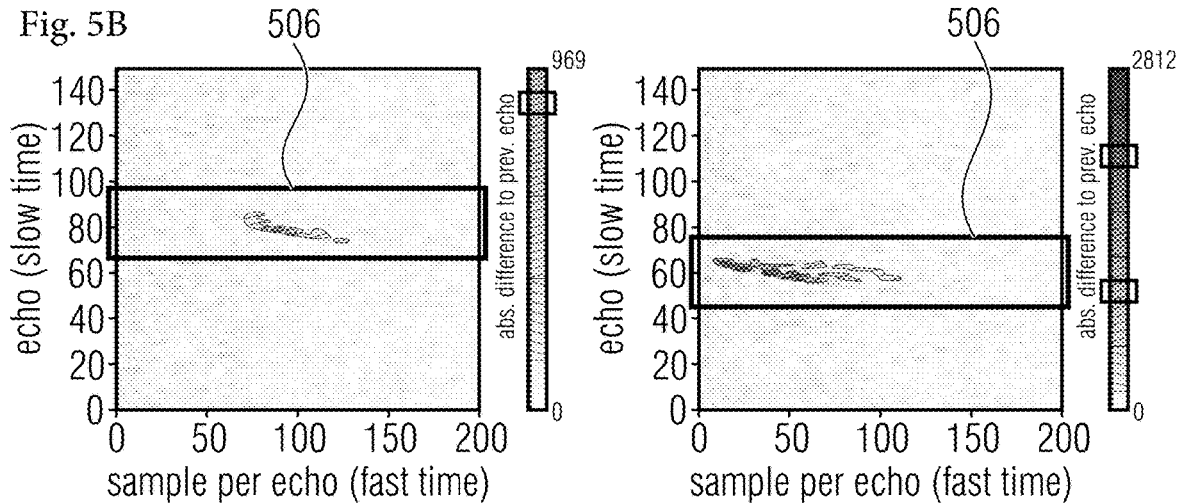
Figure 5:
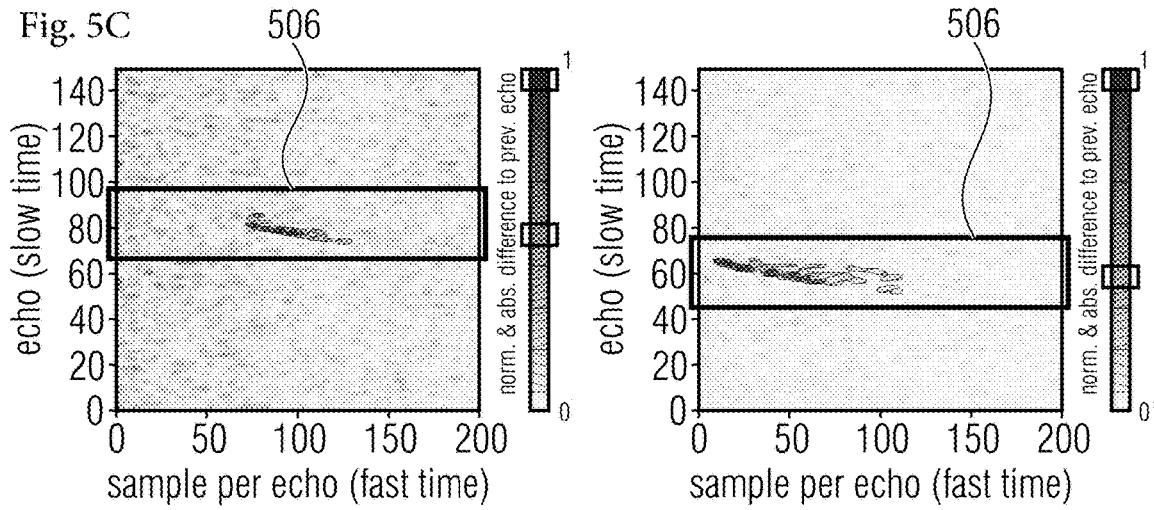

FIG. 5 illustrates echo signals at different stages of the signal processing for two exemplary sequence of sampled ultrasonic echo signals 12, shown in the left and right panels of FIGS. 5a-5c, respectively, FIG. 5a illustrates two exemplary sequences of sampled ultrasonic echo signals 12. Each horizontal line of the diagrams represents one sampled ultrasonic echo signal 12. Thus, the axis labeled as slow time axis represents an index of the successive echo sequences. The axis labeled as fast time axis represents a sample index of the samples of the individual sampled ultrasonic echo signals 12, for example as the abscissa of the diagrams of FIG. 4. In FIG. 5, signal strength is coded in grey scale. The diagrams of FIG. 5b illustrate the absolute values 42 of echo envelope differentials 42 of the data shown in FIG. 5a. With respect to the sequence of echo signals, the signature of a moving object in the echo envelope differentials moves along the fast time axis. In the example of FIG. 5, the signature moves towards shorter times. In other words, the distance information belonging to the moving object may be extracted from the envelope of an amplified echo signal. By observing the envelope over multiple echoes, the relative movement may be detected.

Figure 6A:
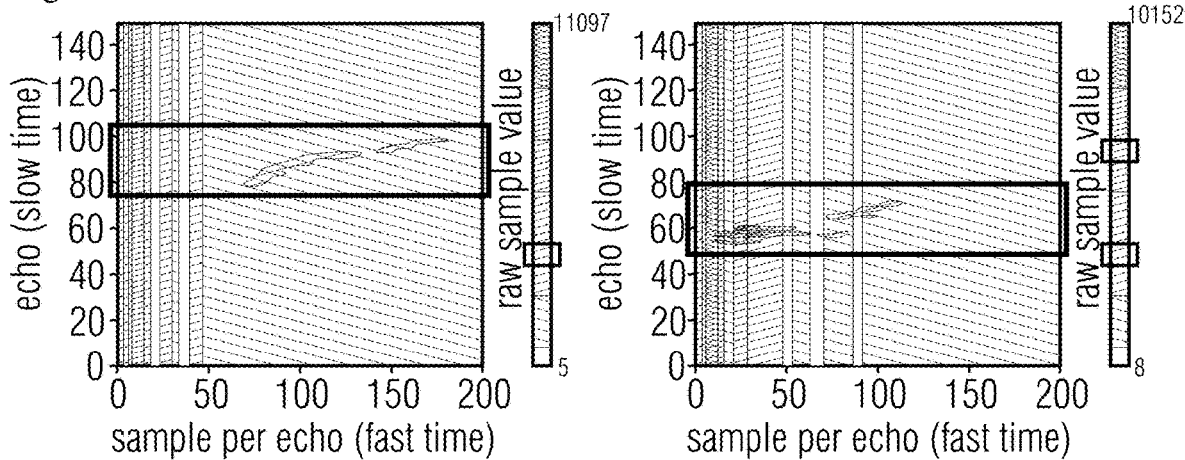
FIGS. 6a-6c illustrate further examples of a sequence of echo signals at different stages of the signal processing for an object moving in a second direction.
Figure 6B:
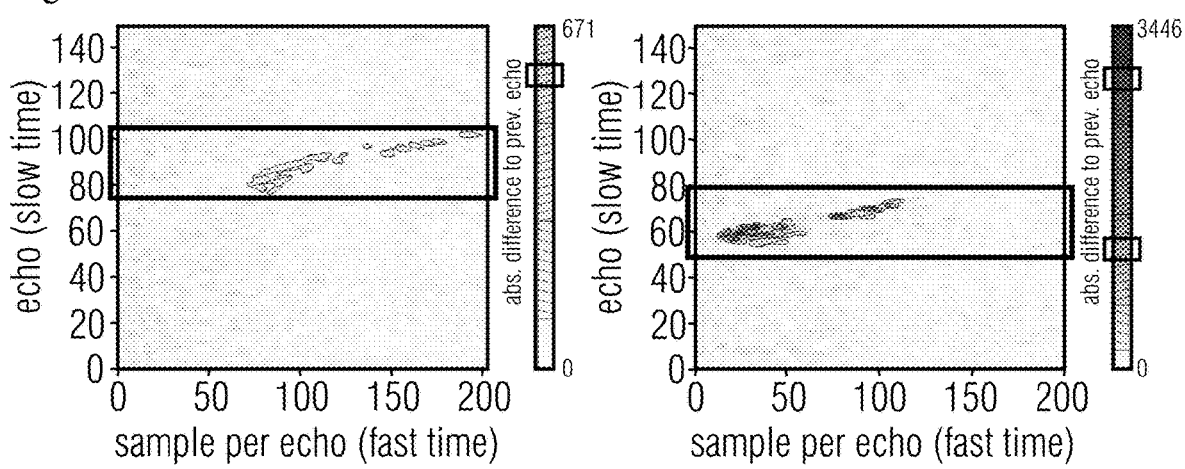
Figure 6C:
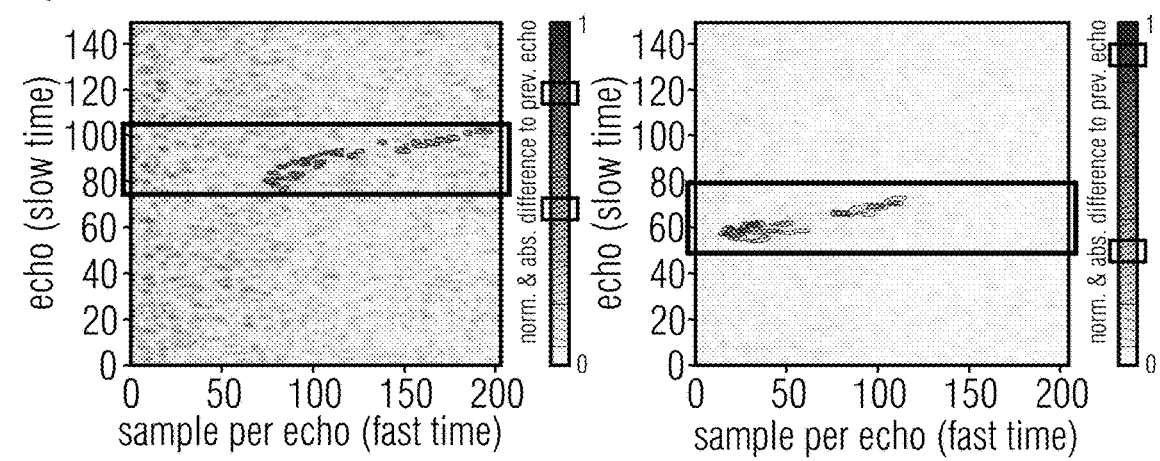

FIGS. 6a-6c shows diagrams with same meaning as those illustrated in FIGS. 5a-5c, however, the data represented by the diagrams of FIG. 6 is an example in which the object moves to the opposite direction in comparison to FIG. 5, indicated by the fact that the signature of the moving object moves towards samples of later times when following the sequence of echo signals.

Thus, as illustrated by means of FIGS. 5 and 6, the concept of the apparatus 1 and the method 100 is to exploit the change of a time-of-flight of an ultrasonic pulse reflected by a moving object to detect the moving object and its relative movement with respect to the ultrasonic receiver 10. To this end, the echo envelopes are determined and differences between same are evaluated. Further, the determination of the differentials 32 inherently suppresses signatures caused by still objects, thus ensuring robustness of the method over varying scenarios and/or across different ultrasonic receivers.

In comparison with the state-of-the-art which uses a determination of the Doppler shift for detecting a movement of objects, the concept of the present disclosure may function with a lower pulse repetition rate, being favorable in terms of energy consumption. Also, steps 120, 130, and 140 are operations, which may be implemented comparatively simple, allowing for a cost-efficient and energy-efficient implementation of the apparatus 1. Further, the disclosed method 100 allows for determining the moving direction using a single ultrasonic receiver, providing even further benefit in terms of cost- and energy-efficiency as well as the size of the apparatus 1.

As illustrated with respect to FIGS. 5 and 6, the direction of movement of the moving object is derivable from the sequence of echo signals. It was realized that for this reason, the absolute values 42 of the echo envelope differentials 32 are sufficient for classifying the movement of the object. Determining the absolute values 42 and conducting the classification 150 on the basis of the absolute values 42 has the advantage that the amount of processed and stored data is lower compared to a scenario in which the processing is conducted on the basis of signed values, as the values may be stored as unsigned values. Further, in the absolute values, the signatures of moving objects appear more prominently, which is advantageous for the classification step 150. Thus, even if in view of the aim to determine the moving direction it may appear to be contradictive to discard the information about the sign of the echo envelope differentials, it was realized that determining the absolute values may result in an overall more efficient determination of the moving direction. In particular, the determination 140 of the absolute values 42 may have the effect of ignoring fluctuations and positive/negative differentials since these are considered negligible for the task. Additionally, in combination with the optional normalization step 270 described with respect to FIG. 7 being performed after step 140, the reduction of the amount of data is particularly high. Also, the usage of absolute values is particularly beneficial in combination with the optional step 280 of pooling, as described with respect to FIG. 7.

Resuming the description of FIG. 2, the classification 150 is conducted based on the absolute values 42 of the echo envelope differentials 32. For example, the classification 150 may be on the basis of the absolute values 42 of a sequence of echo envelope differentials 42. That is, module 50 may receive a sequence of the absolute values 42 of successive echo envelope differentials 32 for determining the relative movement of the object. For example, the sequence of absolute values 42 shown in FIG. 5b or 6b may be the input for determining the relative movement of the moving object. In examples, a set of echo signals, e.g. the set of echo signals 506 shown in FIG. 5, may be used as input for the classification 150. In examples, the method 100 may comprise to select a set of echo signals which comprises a signature of a moving object, e.g. by thresholding the echo envelope differentials 32 or the absolute values 42 thereof. In this case, the classification 150 may be conducted on a set of echo signals within which a signature of a moving object is detected. Alternatively, the sequence of echo signals may be subdivided into successive sets 5o6 of successive echo signals, and the classification 150 is performed on the basis one set 5o6 of echo signals, e.g. the absolute values 42 of this set. For example, the sets 5o6 of echo signals may result from optional step 260 described with respect to FIG. 7.

According to examples, step 150 is conducted by means of a machine-learning classifier. Machine-learning methods may be efficient in evaluating two-dimensional data structures, as, for example, represented by preprocessed echo signals. Data resulting from the processing of a sampled ultrasonic echo signal 12, such as the absolute values 42 of the echo envelope differentials 32 may be referred to as a preprocessed echo signal before being input to step 150. In particular, machine-learning methods may be efficient in detecting a signature of a moving object in a set of preprocessed echo signals, and in particular in classifying the relative movement of the moving object.

For example, step 150 may classify whether or not a set of preprocessed echo signals includes a signature of a moving object. Additionally, step 150 may classify a relative movement of a detected moving object that is, a direction of the movement with respect to the ultrasonic receiver 10.

According to alternative examples, step 150 is conducted by means of a cross-correlation of successive echoes.

It is noted, that step 120 of determining the echo envelopes 22 may be conducted by means of any conventional methods for determining envelope functions. For example, the echo envelopes 22 may be determined by digital or analog means. In examples, the envelopes may be determined exactly by means of a Hilbert-transformation. In other examples, the echo envelopes 22 are determined by means of approximation, e.g. by determining the absolute of the samples ultrasonic echo signals 12 and by subsequent low-pass filtering.

Figure 7:
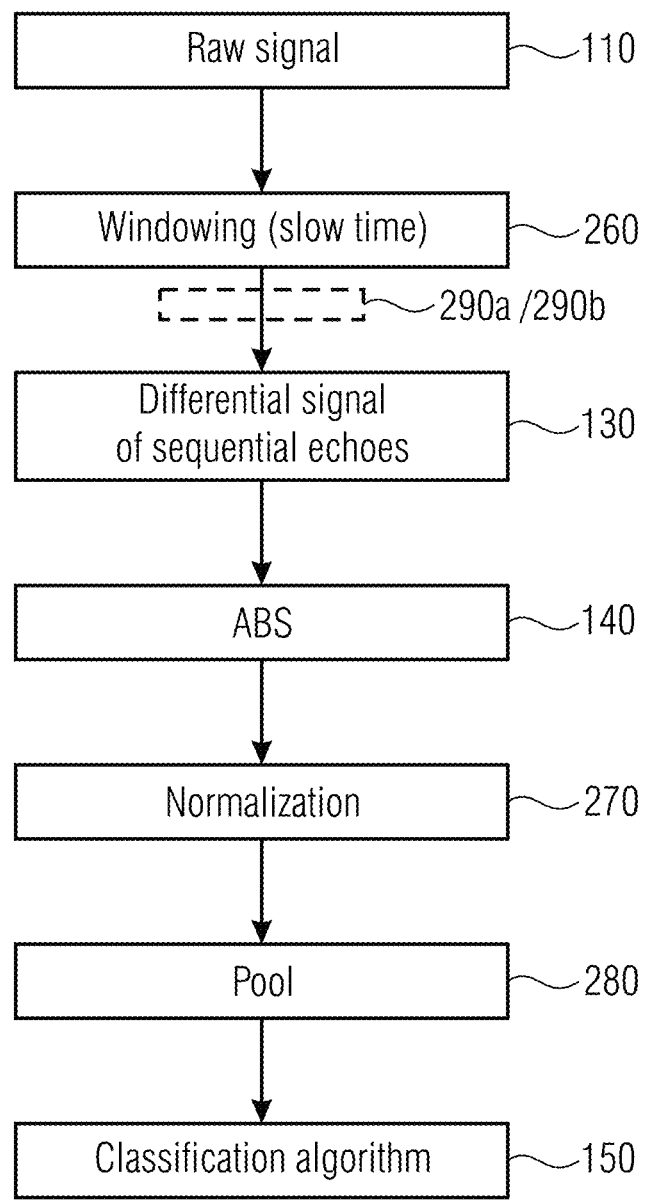
FIG. 7 illustrates a flowchart of a method for detecting a moving object according to a further example.

FIG. 7 illustrates another example of the method 100, which may also be performed by the apparatus 1.

According to examples, the method 100 further comprises a step 270 of normalizing the absolute values 42 of the echo envelope differentials 32 among each other. In this case, the step 150 is conducted on the normalized absolute values of the echo envelope differentials 32 for determining the moving object and its moving direction. FIGS. 5c and 6c show examples of normalized absolute values of the data of FIGS. 5b and 6b, respectively.

For example, step 270 may be performed on a set 506 of echo signals, that is, on the absolute values 42 of a set 506 of echo envelope differentials 32. For example, the sequence of absolute values 42 of echo envelope differentials 32 on which the normalization 270 is performed and/or on which step 150 is performed may include at least 3, e.g. a number of 4, 8, 16, 32, . . . echo envelope differentials 32.

For example, step 270 may be performed by means of a z-score normalization, or by means of a minimum to maximum normalization. For example, the z-score normalization normalizes the absolute values 42 so that a mean and a variance of the absolute values 42 within the set 506 correspond to normalized values, e.g. a mean of 0 and a variance of 1. For example, the minimum to maximum normalization normalizes the absolute values 42 so that the maximum among the absolute values 42 within the set 506 corresponds to a first normalized value, e.g. 1, and additionally, the minimum beyond the absolute values 42 corresponds to a second normalized value, e.g. zero. Normalization of the absolute values 42 harmonizes the input data for the classification 150, resulting in a better classification accuracy and/or providing for a more efficient data representation.

According to examples, the method 100 further comprises a step 280 of executing a pooling function for achieving a data compression of the processed data. The processed data may, for example, refer to the absolute values 42 or the normalized absolute values as determined by the normalization step 270. That is, step 280 may include a data compression of its input data. For example, step 280 may reduce the dimension of the processed data.

As a consequence, by the application of step 280, a required complexity of the classification 150, e.g. a complexity of a classification algorithm, is reduced. The reduction of the dimension of the input data for step 150 may lower data storage requirements, and may save a number of storage operation and computations, leading to a particularly energy-efficient operation.

For example, the pooling function may be a maximum pooling or an average pooling. The advantage of using maximum or average pooling as a compression is that it is supported by most deep-learning accelerators, so that it may simply be implemented by means of neural network methods. Further, also for the case that step 150 is conducted by means of a machine-learning classifier, step 280 also has the effect of regularization: a reduction of details represented by the input data may prevent overfitting, i.e. classifications based on very specific input details, and may allow generalization such as paying more attention to the general tendency instead of details.

Step 280 may be performed after step 270, or may, alternatively, be performed after step 140. In the latter case, the step 270 may optionally be performed on the basis of the pooled data provided by step 280. It is further noted that steps 270 and 280 may be implemented in method 100 independently of each other, i.e. method 100 may include either step 270 or step 280, or both of them. Step 280 of pooling may also be conducted at an earlier stage of the data processing. Conducting step 280 after step 140 has the advantage to avoid that positive and negative numbers could cancel each other out if average pooling is applied, and minima would not be detected if maximum pooling is applied although minima may represent a large change in the echo.

As illustrated in FIG. 7, according to examples, method 100 may further include a step 260. In step 260, a set of successive echo signals is selected for joint processing. Step 260 may be referred to as slow-time windowing. E.g. the set 506 described with respect to FIGS. 5 and 6 may be selected in step 260. The set of successive echo signals may be treated jointly in one or more following steps, e.g. steps 270, 280 and 150. For example, step 260 may result in the selection of set 506 within which a signature of a moving object is detected. That is, from a larger sequence of echo signals, e.g. as those shown in the diagrams of FIG. 5 or 6, the set 506 may be selected, while the other sequences may be discarded. Alternatively, in step 260, the sequence of echo signals may be subdivided into successive sets, each of the successive sets providing an input set for step 150 and optionally steps 270 and/or step 280. In examples, each of the successive sets comprises a fix number of echo signals, e.g. a number of more than 2, e.g. 4, 8, 16, or 32 . . . . Two successive sets 506 may overlap or be disjunct, or may have an offset. This is an optimization parameter, which may be adapted. It is noted that step 260 may alternatively be conducted at a later stage of the method 100, for example, after step 130 or after step 140. However, it is advantageous to conduct step 260 before step 150, and before any of the optional steps 270 and 280.

According to an example, method 100 further comprises a step 290a of windowing, e.g. sample windowing, or fast time windowing.

According to examples, step 290a comprises a windowing of echo envelope 22 so as to ignore a number of leading samples of the echo envelopes for suppressing the influence of ringing, e.g. of directly received ultrasonic signals.

For example, in case the ultrasonic receiver 10 is implemented by means of an ultrasonic transceiver for transmitting ultrasonic pulses and receiving echoes of the ultrasonic pulses, the sampled ultrasonic echo signals 12 may include a ringing of the ultrasonic transceiver. Ignoring or discarding the leading samples, e.g. the first samples after transmitting the ultrasonic pulse, may suppress the influence of ringing and may enhance the classification accuracy.

According to examples, method 100 further comprises a step 290b of sampling the echo envelopes 22 with a limited sampling time, e.g. a limited time with respect to the fast time axis, e.g. a fast time windowing, for the echo envelopes 22 for limiting the detection range for achieving an observation window, e.g. for achieving a defined observation window.

For example, step 290b may result in an observable detection window with a limited height (or depth). Step 290b may be performed together with step 290a or may be a separate step, which may, for example be conducted on the sampled ultrasonic echo signals 12, the echo envelopes 22, the echo envelope differentials 32, the absolute values 42, or after any of the steps 270 or 280. Equivalently, step 290a of ignoring the leading samples may be performed at any stage of method 100 between step 110 and step 150. Steps 290a and 290b may be implementable independently from each other. The earlier step 290a and/or step 290b is performed, the less data has to be processed, so that it may be advantageous to conduct these steps either on the sampled ultrasonic echo signals 12 or on the echo envelopes 22. Alternatively, step 290a and/or step 290b may be part of step 110, e.g. the steps may be performed before sampling or as part of the sampling by configuring, in case of step 290a, the time offset between a transmission of an ultrasonic pulse and a time instance after which the sampling will be started, and, in case of step 290b, a time duration of the sampling, i.e. how long will be sampled.

In other words, according to an example, the first samples of a single echo envelope may be discarded to suppress the influence of ringing. By limiting sampling time for each echo, the detectable range can be limited, leading to an observable window with a limited height. This allows, for example within a counting scenario, to ignore animals like dogs or cats, and also allows for differentiating whether small children shall be detected or not.

Figure 8:
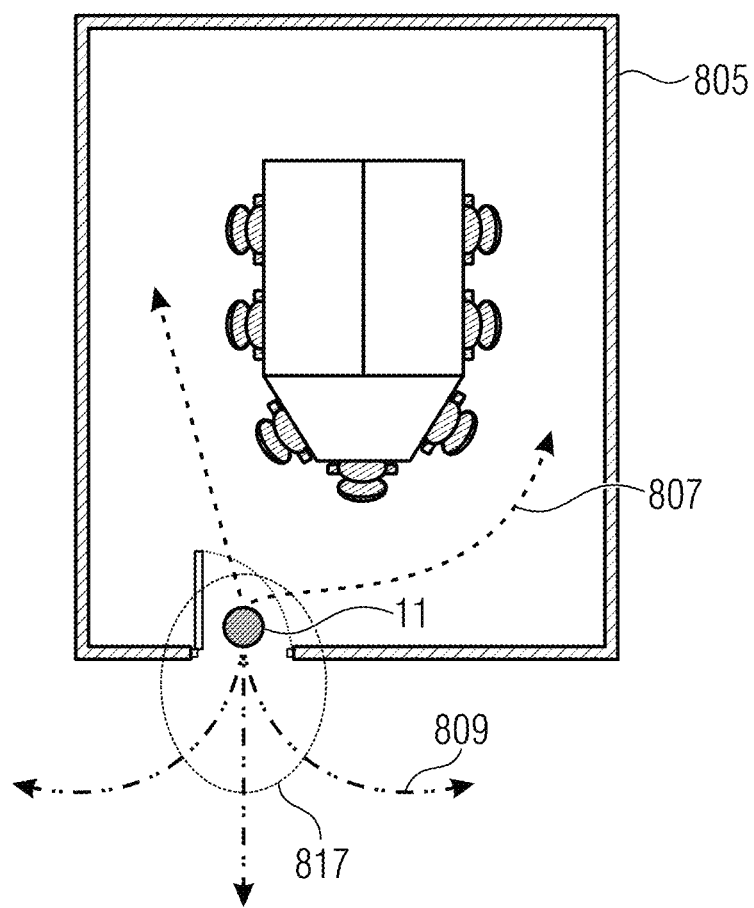
FIG. 8 illustrates an example of an application scenario for an object counting system.

FIG. 8 illustrates an example of a scenario in which the apparatus 1 and the method 100 may be applied for counting of persons entering or leaving a room 805. The apparatus 1 may detect persons leaving or entering the room 805. Further, the apparatus 1 may differentiate between persons entering the room, e.g. using one of walking paths 807, or persons leaving the room 805, e.g. using one of walking paths 809. In the scenario of FIG. 8, where persons passing a door are to be detected, the apparatus 1, or at least the ultrasonic sensor 11, including the ultrasonic transmitter 13 and the ultrasonic receiver 10, or including the ultrasonic transceiver 14, may be placed at the outside or inside of the door of room 805. Alternatively, the sensor may be mounted at the doorframe, or above the door or at the ceiling. In examples, the sensor may be integrated directly into the doorframe, allowing concealing the sensor.

According to the scenario of FIG. 8, an ultrasonic beam field 817 of the ultrasonic sensor 11 is directed towards a region which is to be passed for passing the door, and the ultrasonic receiver is arranged to receive ultrasonic echo signals from the ultrasonic beam field 817.

In alternative scenarios not including a region as restricted as a door, such as hallways, larger rooms or sales retail spaces (areas without clear entrance points such as doors or very wide entrance points, such as doors or very wide entrance points), the ultrasonic sensor 11 may be mounted at the ceiling or below the ceiling, but still above the head of passersby. Thus, the apparatus 1 may be used at locations other than office building, e.g. at entrances of shopping malls inside shops, or shopping malls to monitor people flow and points of interest, at stadiums or museums to count visitors, in schools, at airports and other building complexes, for public transport, e.g. at ferries, trains of buses, for tracking elderly people at home, toilet counter, etc.

Figure 9:
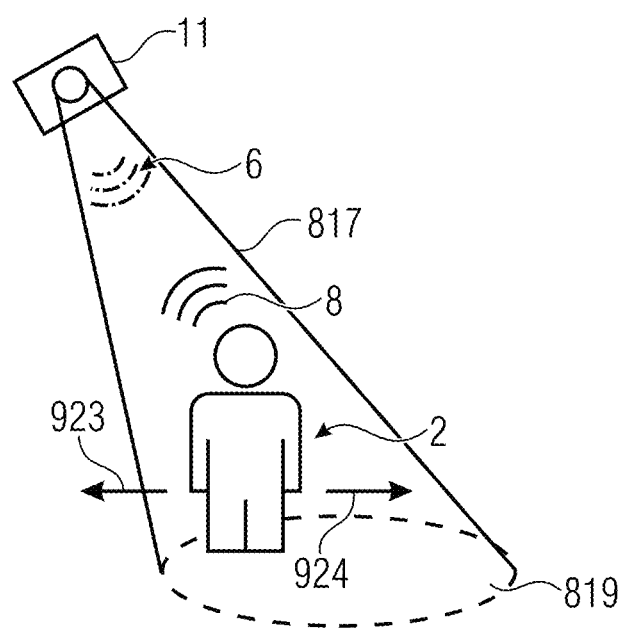
FIG. 9 illustrates an example of a pulse-echo measurement principle.

FIG. 9 illustrates an example of a pulse-echo method, which may be implemented in step 110 for providing the echo signals 12. FIG. 9 illustrates a scenario of detecting a moving person 2. For example, an ultrasonic transmitter of the ultrasonic device 11 may be excited with a pulsed alternating voltage of fixed or variable frequency resulting in the radiation of ultrasonic waves (or pulses) so as to create an ultrasonic beam 817. The ultrasonic beam 817 covers a detection zone 819. The waves 6 may be reflected from walls, surrounding objects and still or moving objects such as persons or animals. Reflected waves 8 may be detected by the ultrasonic receiver 10. Apparatus 10 and method 100 may differentiate between a first moving direction 923 and a second moving direction 924, which may be opposite to each other. That is, the first and the second moving directions may be opposite directions along the moving axis of person 2, the moving axis being parallel to the floor.

For example, the transmitter 14 or transducer 13 may be excited with an ultrasonic frequency of 20 kHz or from 20 kHz. In examples, the frequency is in a range from 20 kHz to 100 kHz, providing for a wide observable range, e.g. a wide beam 817, due to lower directivity of low-frequency ultrasound. Therefore, in another example, the frequency is in a range between 20 kHz and 60 kHz, or between 20 kHz and 50 kHz. In one example, the frequency is 40 kHz. These frequency ranges provide for a good tradeoff between a small membrane of the transducer (small device dimensions) and a broad ultrasonic beam (which may be more focused for higher frequencies).

Figure 10:
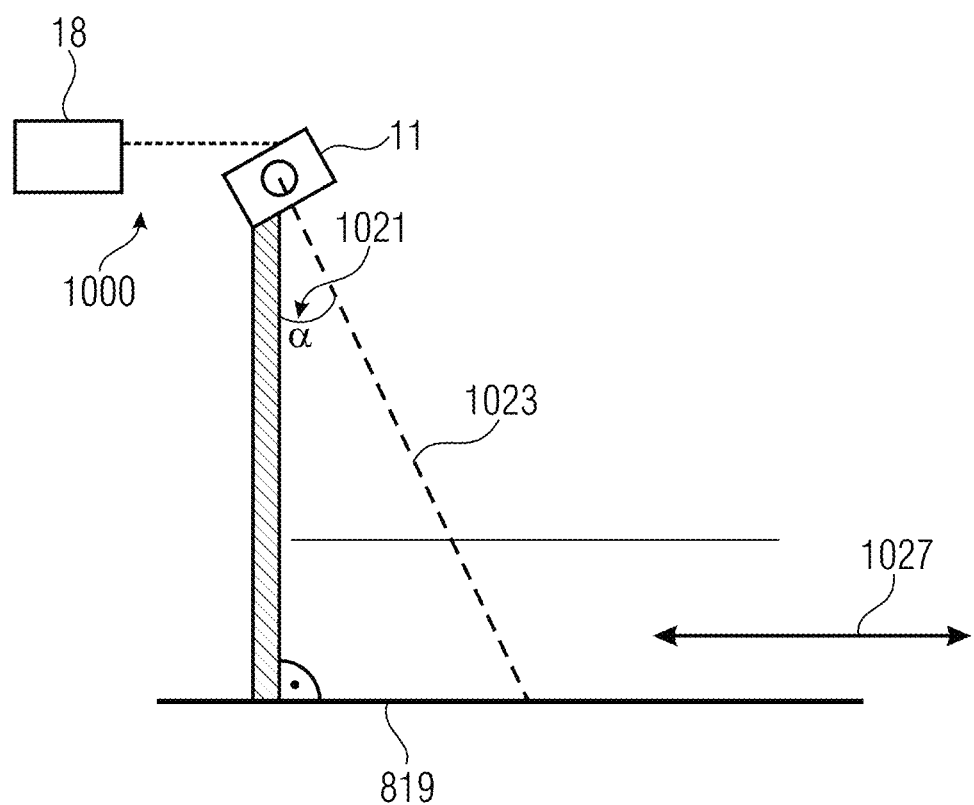
FIG. 10 illustrates an object counting system according to an example.

FIG. 10 illustrates an object counting system 1000 comprising an ultrasonic transmitter for transmitting an ultrasonic signal into a scene, and further comprising the apparatus 1. As discussed with respect to FIG. 3, the ultrasonic receiver 10 and the ultrasonic transmitter may be part of ultrasonic sensor 11, e.g. in form of an ultrasonic transceiver or in form of separate receiver and transmitter.

By means of determining the moving direction of the moving objects, the counting system 100 may determine a net change of a number of objects being situated at either side of the system, which change resulted from a passing of objects through a detection zone covered by the system 100. The counting of people based on entry or exit events has the advantage that usually a small area must be covered at an entrance compared to a complete room. The entrance width is usually limited, leading to very few people with typically linear movement patterns that need to be classified at a time.

Thus, according to examples, the ultrasonic receiver 10, e.g. represented by the ultrasonic sensor 11 in FIG. 10, is mounted in the scene at a passage way or above the passage way, e.g. in doorframes of the passage way or in the ceiling. For example, the passage way is a door or an entrance/exit way.

According to embodiments, the apparatus 1 comprises a single ultrasonic transducer. Alternatively, apparatus 1 may comprise a single ultrasonic transmitter and a single ultrasonic receiver.

Method 100 allows to achieve state-of-the-art accuracy using only a single ultrasonic sensor. Using only a single sensor reduces hardware effort in processing complexity as well as the communication overhead implied by the usage of multiple sensors. Further, using a single ultrasonic sensor may reduce the size of the device, i.e. apparatus 1, allowing for an easy mounting at sides of doorframes or ceilings, or an easy integration into doorframes, or a concealed installation. As for example in the scenario of FIG. 8, the implementation using a single ultrasonic sensor 11 is especially well-suited for narrow passages like office doors, because in these cases a single sensor can cover the complete door area. The radiation pattern can even be broadened by using lower frequencies or transducers with smaller diameter.

Alternatively, the apparatus 1 may comprise multiple integrated ultrasonic devices, e.g. an ultrasonic sensor array comprising multiple ultrasonic receivers. Beamforming may be applied so as to define the detection zone 819 or the beam 817 spatially. For example, the multiple integrated ultrasonic devices may be integrated on a single chip. Accordingly, according to examples, the apparatus 1 comprises one or more ultrasonic receivers integrated on a single chip.

According to examples, apparatus 1 comprises a communication module, e.g. for wireless or cable-based communication.

FIG. 10 further illustrates an example for an orientation of a main receiving axis 1023 of the ultrasonic receiver 10 or the ultrasonic sensor 11, respectively. For a classification of the moving direction, it may be advantageous to direct the main receiving axis 1023 parallel to the moving axis 1027 along which the object is expected to move, e.g. parallel to the floor. On the other hand, a region where the person shall be detected is advantageously limited to a confined detection zone 819. A good tradeoff between these aspects is to select an angle 1021 between the main receiving axis 1023 and an axis 1024 perpendicular to the moving plane, e.g. the floor, in a range of 20° to 60°. For example, an angle of 45° may provide a good tradeoff between the aforementioned aspects. In some example, an angle of 30° may be beneficial, e.g. to avoid slip-through from sides at doors. Angles within these ranges may also provide the advantage of allowing moderate sampling rates for the ultrasonic echoes, thus allowing for a reliable detection of a person.

Thus, according to examples, method 100 comprises a step of receiving ultrasonic echo signals 8. In examples, a main receiving axis for receiving the ultrasonic echo signals 8 is offset by an angle between 20° and 60° or between 40° and 50°, or about 45°, from an axis, which is perpendicular to a movement axis with respect to which movement axis the relative movement of the moving object 2 is to be determined.

The angle 1021 may be realized by a corresponding mounting of the ultrasonic device 11 and/or by applying a receiver/transceiver with a well-defined asymmetric radiation pattern, e.g. due to anisotropic properties of a transducer membrane.

Figure 11:
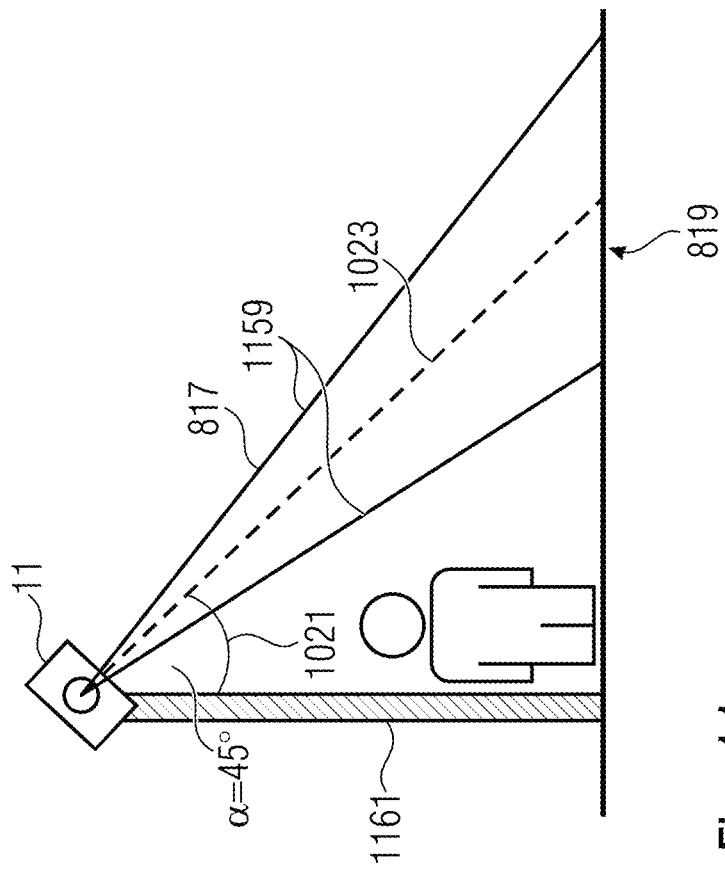
FIG. 11 illustrates examples for the receiving axis of an ultrasonic receiver.
Figure 11:
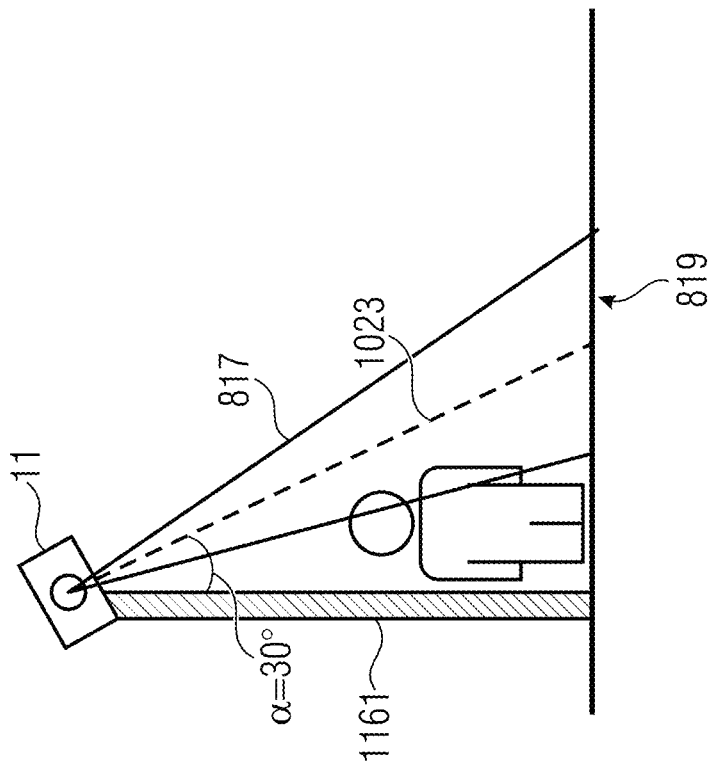

FIG. 11 illustrates examples of detection zones 819, which may occur for different angles between the receiving axis 1023 and the moving plane. Detection points where people may come from any side towards a passage 1161, e.g. office room doors, small persons might slip through without crossing the ultrasonic beam 817, defined by beam limits 1159, e.g. in case of an angle 1021 of 450 as illustrated in the right panel of FIG. 11. Such a scenario could lead to a missed entry or exit event. Therefore, in an alternative example, the angle 1021 is 30°, which may reduce the distance between ultrasonic beam and the passage, e.g. the door, thus also reducing the probability of missing an entry or exit event.

Figure 12:
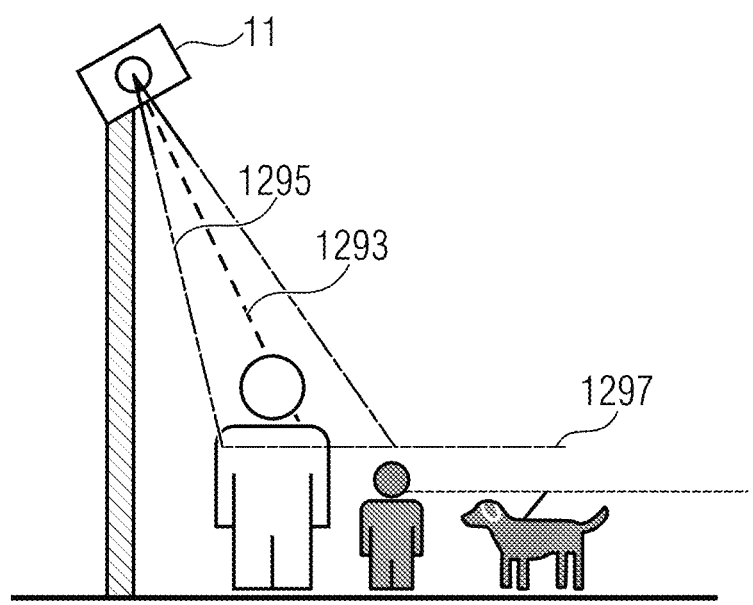
FIG. 12 illustrates an example of a detection window.

FIG. 12 illustrates an example for windowing, i.e. fast time windowing, of the samples of the echo signals or echo envelopes 22, e.g. an example of the windowing performed in steps 290a and/or 290b. The echo envelopes 22, or the sampled ultrasonic echo signals 12, or any of the preprocessed echo signals, may be limited so as to represent a defined detection window 1293 or detection range with respect to the ultrasonic sensor 11. A first window limit 1295 may be used to suppress ultrasonic ringing, and may represent a limit to short distances from the ultrasonic sensor 11, e.g. an upper limit in case of the sensor being mounted above the scene 5. Limit 1295 may be applied to the sampled echo signals in step 290a. A second limit 1297 may set a limit to large distances, i.e. a limit to long propagation paths of the ultrasonic pulses. Limit 1295 may be applied to the sampled echo signals in step 290b. The second limit may be used to ignore animals and reduce multipath propagation. For examples, children and/or animals may be ignored by adjusting the lower limit, if desired. For example, the left and right panels of FIGS. 5a-5c and 6a-6c may represent data for a small and a tall person, respectively. For the tall person, the detected distance to the sensor is lower (echo positioned at lower sample indices), so that these persons may be differentiated. In other words, method 100 allows to select a limited observable height window, and therefore, method 100 allows to ignore animals like dogs or cats. Also, the limited observable height window may be used to decide whether children should be detected or not.

Figure 13:
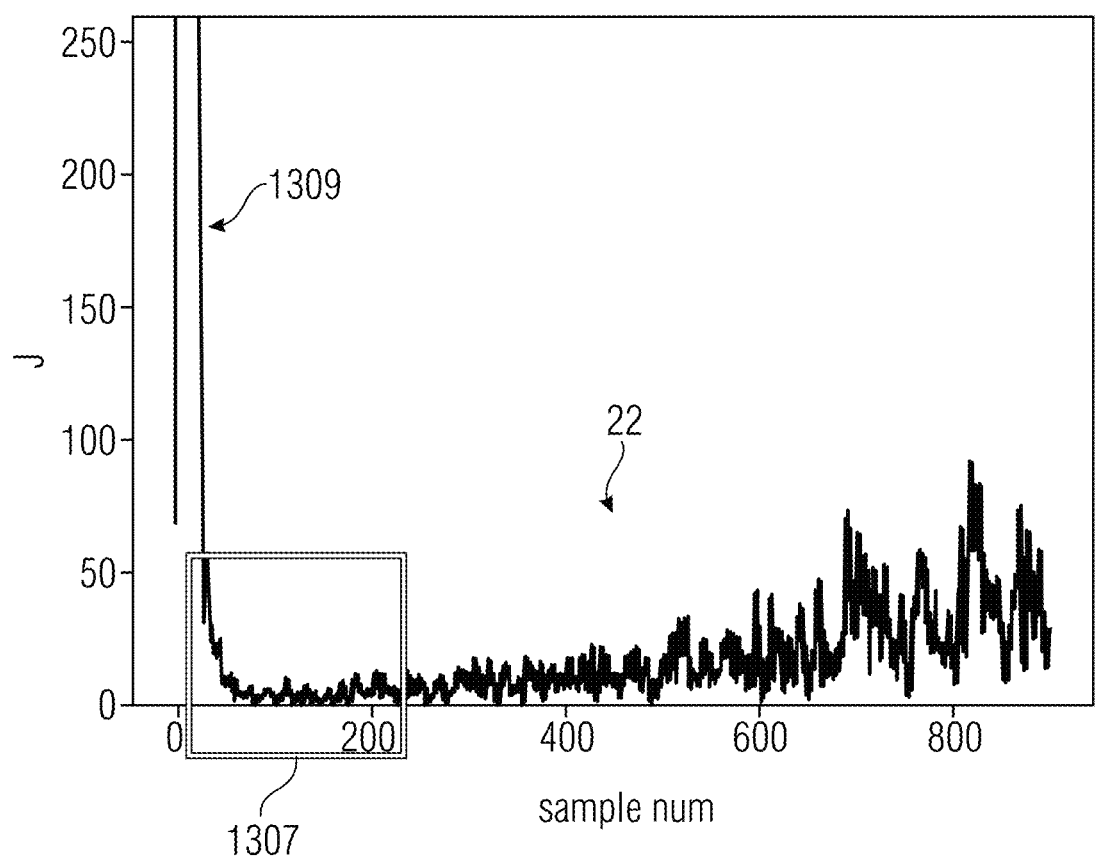
FIG. 13 illustrates an example of an echo envelope.

FIG. 13 shows a diagram, which illustrates an example for an echo envelope 22. At sampling times being temporarily close to the transmission of an ultrasonic pulse, the samples show a high intensity I which may be attributed to ultrasonic ringing. This signature 1309 of ultrasonic ringing may be ignored by selecting within a window 1307 for further processing.

In the following, the power consumption of an embodiment of the apparatus 1 is compared to the power consumption of the same hardware when using pulsed wave or continuous wave Doppler operation. The embodiment is implemented by means of a PCB comprising separate transducers for transmitting and receiving ultrasonic waves. An external pulsed sine voltage is provided to the transmitter to excite the transmitter membrane. Table 1 to Table 3 summarize the DC power consumption required for amplification of the input pulses to achieve the necessary excitation voltage of the transducer membranes. The numbers in table 1 to 3 refer to test conditions of a frequency of 40 KHz, $D_{pulse}$=5 V, $D_{off\_pulse}$=2.5 v. Table 1 includes exemplary data for measurements using pulsed wave Doppler ultrasonic detection for varying pulse counts, i.e. the number of periods of the carrier frequency, e.g. 40 KHz. DC power supply was limited to a current of 250 mA to avoid damages of the transducer on the demonstration board (cf. last two lines of table 1, in which the current limit applies). For this reason, the voltage breaks down for 8 or 16 pulses, so that the power consumption for these cases appears to be lower. Corrected results by regression would assume powers well above 1 W. Power for continuous wave Doppler detection would then be in the approximate range of 6 W. Table 2 shows exemplary data for measurements for pulsed wave Doppler ultrasonic detection for varying burst periods, i.e. the time periods between two successive excitations of the transducer membrane. The last line of Table 2 shows the power consumption using an example of the herein disclosed pulse-echo method, for which a power of 3 mW was measured. Table 3 shows a comparison between exemplary values of the power consumption for continuous wave Doppler methods and the power for pulsed echo methods. A factor of approximately 2000 is between the power for pulsed echo method and continuous wave Doppler method, i.e. more than three orders of magnitude.

TABLE 1

| pulse count | burst period in ms | $V_{cc}$ in V | $I_{cc}$ in mA | P in mW |
| --- | --- | --- | --- | --- |
| 1 | 1 | 5.000 | 22 | 110.0 |
| 2 | 1 | 5.001 | 45 | 225.0 |
| 4 | 1 | 5.001 | 110 | 550.1 |
| 8 | 1 | 4.753 | 251 | 1193.0 |
| 16 | 1 | 2.668 | 251 | 669.7 |

TABLE 2

| pulse count | burst period in ms | $V_{cc}$ in V | $I_{cc}$ in mA | P in mW |
| --- | --- | --- | --- | --- |
| 1 | 0.125 | 5.000 | 237 | 1185.0 |
| 1 | 0.25 | 5.001 | 104 | 520.1 |
| 1 | 0.5 | 5.000 | 48 | 240.0 |
| 1 | 1 | 5.001 | 24 | 120.0 |
| 1 | 2 | 5.001 | 11.6 | 58.0 |
| 1 | 4 | 5.000 | 5.6 | 28.0 |
| 1 | 8 | 5.000 | 2.8 | 14.0 |
| 1 | 16 | 5.000 | 1.4 | 7.0 |
| pulse-echo method | | 5.001 | 0.6 | 3.0 |

TABLE 3

| power for continuous wave Doppler | approx. 6000 mW |
| --- | --- |
| power for pulse-echo method | 3 mW |

The low power consumption achievable by the disclosed method 100 allows a cableless long-term operation for smart home/office application when combined with IOT connectivity. The low effort signal processing ensures a high classification accuracy at little additional power consumption. In particular, the operation of the apparatus 100 requires low power compared to radar, ultrasonic continuous wave, CW, methods. Also, method 100 has the advantage of a low power consumption compared to ultrasonic pulsed wave, PW, methods due to much lower pulse repetition frequency. In particular, for achieving Doppler frequency resolution as with PW/CW measurements to detect high speeds, using the herein disclosed pulse echo principle, a lower pulse repetition frequency is sufficient.

In comparison to PW methods, the pulse echo principle further has the advantage that loud high-pitch noise may be avoided. Further, compared to radar methods, a much lower frequency may be used for the same resolution due to the significantly lower propagation velocity of sound waves, approximately 343 m per second, compared to electromagnetic waves, approximately 300,000 km per second. Lower frequency may reduce hardware complexity, power consumption and may simplify a PCB layout.

The preprocessing of the ultrasonic signals, i.e. steps between step 110 and 150 of method 100, enables the usage of machine-learning classifiers using only few hundreds of parameters which are nevertheless able to achieve state-of-the-art accuracy. The low number of parameters leads to a very low computational effort and very few energy-consuming storage interactions. The low power consumption, in turn, facilitates an ultra-low power operation, or even battery-powered systems. A cable-free installation, for example, based on single ultrasonic transducers, opens up new used cases which require flexible, temporary positioning, such as flow control during public festivals.

In comparison to approaches which use infrared time-of-flight cameras, the herein disclosed method requires less computational resources and is more energy efficient. In comparison to radar solutions, the herein disclosed method may be less prone to multi-path propagation in metallic surroundings, and to interference with electromagnetic waves. Also, the herein disclosed method may provide a more accurate definition of detection windows and a lower power consumption. In comparison to PIR sensor solutions, the herein disclosed method may be less prone to thermal gradients which may be caused by ventilation, may provide for a better differentiation between persons and animals and a higher accuracy.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some examples, one or more of the most important method steps may be executed by such an apparatus.

Depending on certain implementation requirements, examples of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some examples according to the invention comprise a data carrier having electronically readable control signals, which are capable of cooperating with a programmable computer system, such that one of the methods described herein is performed.

Generally, examples of the present invention can be implemented, or can be at least partially implemented, as a computer program product with a program code, the program code being operative for performing one of the methods when the computer program product runs on a computer. The program code may for example be stored on a machine readable carrier.

Other examples comprise the computer program for performing one of the methods or method steps described herein, stored on a machine readable carrier.

In other words, an example of the inventive method is, therefore, a computer program having a program code for performing one of the methods or method steps described herein, when the computer program runs on a computer.

A further example of the inventive methods is, therefore, a data carrier (or a digital storage medium, or a computer-readable medium) comprising, recorded thereon, the computer program for performing one of the methods or methods steps described herein. The data carrier, the digital storage medium or the recorded medium are typically tangible and/or non-transitory.

A further example of the inventive method is, therefore, a data stream or a sequence of signals representing the computer program for performing one of the methods or method steps described herein. The data stream or the sequence of signals may for example be configured to be transferred via a data communication connection, for example via the Internet.

A further example comprises a processing means, for example a computer, or a programmable logic device, configured to or adapted to perform one of the methods or method steps described herein.

A further example comprises a computer having installed thereon the computer program for performing one of the methods or method steps described herein.

A further example according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus, the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described examples are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the examples herein.

What is claimed is:

1. A method for detecting a moving object in a scene, comprising:
   sampling ultrasonic echo signals from the scene;
   determining echo envelopes of the ultrasonic echo signals;
   determining echo envelope differentials of successive echo envelopes;
   determining absolute values of the echo envelope differentials; and
   conducting a classification based on the absolute values of the echo envelope differentials for determining a relative movement of the moving object.

2. The method of claim 1, further comprising:
   normalizing the absolute values of the echo envelope differentials among each other to calculate normalized absolute values, wherein the step of conducting the classification is conducted on the normalized absolute values of the echo envelope differentials for determining the relative movement of the moving object including determining a moving direction of the moving object.

3. The method of claim 2, further comprising:
executing a pooling function for achieving a data compression of the absolute values or the normalized absolute values.

4. The method of claim 1, further comprising:
windowing of the echo envelopes so as to ignore a number of leading samples of the echo envelopes for suppressing ringing.

5. The method of claim 1, further comprising:
sampling the echo envelopes with a limited sampling time for limiting a detection range for achieving an observation window.

6. The method of claim 1, further comprising:
conducting the classification by a machine learning classifier, or
conducting the classification by a cross-correlation of successive ultrasonic echo signals.

7. An apparatus for detecting a moving object in a scene, the apparatus comprising:
an ultrasonic receiver for receiving ultrasonic echo signals from the scene and for sampling the ultrasonic echo signals; and
a processing means configured to:
determine echo envelopes of the ultrasonic echo signals,
determine differentials of successive echo envelopes for providing echo envelope differentials,
determine absolute values of the echo envelope differentials, and
conduct a classification based on the absolute values of the echo envelope differentials for determining a relative movement of the moving object.

8. The apparatus of claim 7, wherein the processing means is further configured to normalize the absolute values of the echo envelope differentials among each other to calculate normalized absolute values, wherein the classification is conducted on the normalized absolute values of the echo envelope differentials for determining the relative movement of the moving object including a moving direction of the moving object.

9. The apparatus of claim 8, wherein the processing means is further configured to execute a pooling function for achieving a data compression of the absolute values or the normalized absolute values.

10. The apparatus of claim 7, wherein the processing means is further configured to window the sampled ultrasonic echo signals so as to ignore a number of leading samples of the echo envelopes for suppressing ringing.

11. The apparatus of claim 7, wherein the processing means is further configured to sample the echo envelopes with a limited sampling time for limiting a detection range for achieving an observation window.

12. The apparatus of claim 7, wherein the processing means is further configured to conduct the classification by a machine learning classifier or by a cross-correlation of successive ultrasonic echo signals.

13. The apparatus of claim 7, wherein the ultrasonic receiver is arranged to have a main receiving axis offset by an angle between 20° and 60° from a vertical axis that is perpendicular to a ground or ceiling plane in the scene.

14. The apparatus of claim 7, wherein the ultrasonic receiver is mounted in the scene at a passage way for persons or above the passage way.

15. An object counting system comprising:
an ultrasonic transmitter for transmitting an ultrasonic signal into a scene for detecting a moving object in the scene;
an ultrasonic receiver for receiving ultrasonic echo signals from the scene and for sampling the ultrasonic echo signals; and
a processing means configured to:
determine echo envelopes of the ultrasonic echo signals;
determine differentials of successive echo envelopes for providing echo envelope differentials;
determine absolute values of the echo envelope differentials; and
conduct a classification based on the absolute values of the echo envelope differentials for determining a relative movement of the moving object.

16. The object counting system of claim 15, wherein the ultrasonic receiver is arranged to have a main receiving axis offset by an angle between 20° and 60° from a vertical axis that is perpendicular to a ground or ceiling plane in the scene.

17. The object counting system of claim 15, wherein the ultrasonic receiver is mounted in the scene at a passage way for persons or above the passage way.

18. The object counting system of claim 15, wherein the system comprises
a single ultrasonic transmitter and a single ultrasonic receiver, or
a single ultrasonic transceiver.

19. The object counting system of claim 15, wherein the processing means is further configured to sample the echo envelopes with a limited sampling time for limiting a detection range for achieving an observation window.

20. The object counting system of claim 15, wherein the processing means is further configured to conduct the classification by a machine learning classifier or by a cross-correlation of successive ultrasonic echo signals.

* * * * *